(12) United States Patent
Hamada et al.

(10) Patent No.: US 7,726,881 B2
(45) Date of Patent: Jun. 1, 2010

(54) HYDRODYNAMIC BEARING DEVICE

(75) Inventors: Tsutomu Hamada, Hirakata (JP);
Takafumi Asada, Hirakata (JP);
Hideaki Ohno, Sennan (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/393,542

(22) Filed: Feb. 26, 2009

(65) Prior Publication Data

US 2009/0154851 A1   Jun. 18, 2009

Related U.S. Application Data

(62) Division of application No. 11/195,813, filed on Aug. 3, 2005, now Pat. No. 7,513,689.

(30) Foreign Application Priority Data

Aug. 5, 2004   (JP) .............................. 2004-229825

(51) Int. Cl.
*F16C 32/06* (2006.01)
(52) U.S. Cl. ...................... 384/112; 384/107
(58) Field of Classification Search .................. 384/95, 384/100, 107, 111–114, 121, 123–124, 130; 148/267, 287; 501/81, 90–91; 428/446; 429/112; 264/41; 418/178
See application file for complete search history.

(56) References Cited

U.S. PATENT DOCUMENTS

| | | | | |
|---|---|---|---|---|
| 3,450,650 | A * | 6/1969 | Kazuo | 264/41 |
| 3,468,709 | A | 9/1969 | Kummer | |
| 4,056,339 | A * | 11/1977 | Doi et al. | 418/178 |
| 4,692,418 | A * | 9/1987 | Boecker et al. | 501/90 |
| 4,799,970 | A | 1/1989 | Koiso et al. | |
| 5,033,579 | A * | 7/1991 | Vanderstraeten | 181/208 |
| 5,080,378 | A | 1/1992 | Kagawa | |
| 5,504,637 | A | 4/1996 | Asada et al. | |
| 5,635,430 | A | 6/1997 | Divakar et al. | |
| 5,762,895 | A | 6/1998 | Schwetz et al. | |
| 5,868,502 | A * | 2/1999 | Cariveau et al. | 384/93 |
| 5,885,005 | A * | 3/1999 | Nakano et al. | 384/113 |
| 5,988,886 | A | 11/1999 | Takahashi | |
| 6,034,454 | A | 3/2000 | Ichiyama | |
| 6,361,216 | B1 | 3/2002 | Takahashi et al. | |
| 6,390,681 | B1 | 5/2002 | Nakazeki et al. | |
| 6,505,970 | B2 | 1/2003 | Takahashi et al. | |
| 6,793,394 | B2 | 9/2004 | Gomyo et al. | |

(Continued)

FOREIGN PATENT DOCUMENTS

EP   685437   12/1995

(Continued)

*Primary Examiner*—Marcus Charles
(74) *Attorney, Agent, or Firm*—Wenderoth, Lind & Ponack, L.L.P.

(57) ABSTRACT

A hydrodynamic bearing device is provided for use with a spindle motor. The hydrodynamic bearing device has a sleeve made of a sintered metal that is obtained by sintering a sintering material that is iron, an iron alloy, copper, a copper alloy or a mixture thereof. This sintered metal has independent pores, which do not communicate with each other, by selecting conditions for forming a desired sintered body within a predetermined range. The conditions includes a grain size of powdered metal of a material for the sintered metal, a molding pressure when the molded body is formed, sintering temperature and sintering period in the sintering step.

8 Claims, 12 Drawing Sheets

U.S. PATENT DOCUMENTS

| | | |
|---|---|---|
| 7,237,955 B2 | 7/2007 | Asada et al. |
| 7,237,956 B2 | 7/2007 | Asada et al. |
| 2005/0169561 A1 | 8/2005 | Asada et al. |

FOREIGN PATENT DOCUMENTS

| | | | | |
|---|---|---|---|---|
| JP | 61064851 | | | 4/1986 |
| JP | 02277704 | | | 11/1990 |
| JP | 04228505 | | | 8/1992 |
| JP | 04228505 | A | * | 8/1992 |
| JP | 08296580 | | | 11/1996 |
| JP | 09009560 | A | * | 1/1997 |
| JP | 03138301 | A | * | 6/1999 |
| JP | 2003277895 | A | * | 10/2003 |
| JP | 2003-322145 | | | 11/2003 |
| JP | 2004084864 | A | * | 3/2004 |

* cited by examiner

HYDRODYNAMIC BEARING DEVICE

CROSS-REFERENCE TO RELATED APPLICATIONS

This is a divisional of U.S. application Ser. No. 11/195,813, filed Aug. 3, 2005, now U.S. Pat. No. 7,513,689.

This application claims priority under 35 U.S.C. §119 to Japanese Patent Application No. 2004-229825, filed Aug. 5, 2004. The entire disclosure of Japanese Patent Application No. 2004-229825 is hereby incorporated herein by reference.

BACKGROUND OF THE INVENTION

1. Field of the Invention

The present invention generally relates to a hydrodynamic bearing device utilizing a dynamic pressure and a method for manufacturing the device.

2. Background Information

In recent years, a storage capacity of a recording apparatus or the like using a disk or the like has been increasing, and a data transmission rate thereof has been increasing as well. A high speed and a high precision of rotation is necessary for a spindle motor that is used for such a recording apparatus. Therefore, a hydrodynamic bearing device is used for a rotation shaft portion of the spindle motor. A conventional hydrodynamic bearing device will be described below with reference to FIGS. 9 and 10.

FIG. 9 is a cross sectional view of a spindle motor including a conventional hydrodynamic bearing device. As shown in FIG. 9, a sleeve 101 having a bearing bore 101a is made of a sintered metal that is made of sintering powdered metal, such as a copper alloy. The sleeve 101 is made of a sintered metal mainly to reduce manufacturing costs. If the sleeve 101 is produced by machining a metal bar or the like, a lot of chips will be generated as waste material. In contrast, a sintered metal does not generate such chips. In addition, the time necessary for producing a sleeve using a sintered metal is a fraction of the time necessary for producing the same by machining. Accordingly, the production using a sintered metal is suitable for low-cost mass production.

On the outer surface of the sleeve 101, a sleeve cover 114 is provided. The sleeve cover 114 is made of a metal that is not a sintered metal. A shaft 102 is inserted in the bearing bore 101a of the sleeve 101 in a rotatable manner. A thrust flange 103 is fixed to a lower end portion of the shaft 102. The thrust flange 103 is housed in a space enclosed by the sleeve 101, the sleeve cover 114 and a thrust plate 104. A lower face of the thrust flange 103 in FIG. 9 is opposed to the thrust plate 104. An upper face of the thrust flange 103 is opposed to a lower end face of the sleeve 101.

A rotor hub 105 is fixed to an upper end portion of the shaft 102. A rotor magnet 106 is fixed to an inner surface of the rotor hub 105. The rotor magnet 106 is opposed to a motor stator 107 that is fixed to a base 108. An inner surface of the bearing bore 101a of the sleeve 101 is provided with dynamic pressure generating grooves 109a and 109b in the radial direction that are well known in the art. In addition, a face of the thrust plate 104 that is opposed to the thrust flange 103 is provided with dynamic pressure generating grooves 110a in the thrust direction that are also well known. Dynamic pressure generating grooves 110b may be formed on at least one of the opposed faces of the thrust flange 103 and the sleeve 101, if necessary. Oil 111, as working fluid, is filled in the space between the shaft 102 and the sleeve 101, including the dynamic pressure generating grooves 109a, 109b, 110a and 110b, as well as in the space between the thrust flange 103 and the sleeve 101 and the space between the thrust flange 103 and the thrust plate 104.

An operation of the conventional hydrodynamic bearing device will be described with reference to FIG. 9. When the motor stator 107 is supplied with power, a torque is generated by the rotor magnet 106, so that the rotor hub 105, the shaft 102 and the thrust flange 103 rotate as one body. As a result of this rotation, the dynamic pressure generating grooves 109a, 109b, 110a and 110b respectively give a pumping pressure to the oil 111 in the corresponding portions. Accordingly, radial bearings are formed at the area of the dynamic pressure generating grooves 109a and 109b for supporting the shaft 102 in the radial direction, while thrust bearings are formed at the area of the dynamic pressure generating grooves 110a and 110b for supporting the flange 103 in the thrust direction. Thus, the shaft 102 and the flange 103 rotate without contacting the bearing bore 101a and the thrust plate 104.

Since the sleeve 101 is made of a sintered metal, it has pores at 2-15% of volume (small spaces contained in the sintered metal). The pores include those called "tissue pores" existing inside the sintered metal and those called "surface pores" opening on the surface of the sintered metal. In a usual sintered metal, the surface pores and the tissue pores are communicated with each other. Although the sleeve 101 made of the sintered metal is impregnated with oil at a pressure lower than an atmospheric pressure in advance, the oil can pass through the sleeve 101 by moving in the pores. In the conventional example, the sleeve 101 is surrounded by the sleeve cover 114 so that the oil does not leak externally by moving through the pores.

According to the structure of the conventional hydrodynamic bearing device shown in FIG. 9, it is necessary to insert the sleeve 101 inside the sleeve cover 114 in the manufacturing process, which increases the number of man-hours in production. Since the sleeve 101 and the sleeve cover 111 are individual parts, the number of parts increases and the cost is also increased. In addition, if the sleeve 101 is inserted in the sleeve cover 114 with an inclined position, as shown in FIG. 10 in the insertion process, the axis of the bearing bore 101a is not kept perpendicular to the surface of the thrust plate 104. In this state, the gap of the thrust bearing or the radial bearing shown in FIG. 9 becomes uneven so that the shaft 102 cannot be supported in a stable manner. If the unevenness of the gap increases, the shaft 102 contacts the bearing bore 101a of the sleeve 101 and the bearing is seized up. The same problem can occur if the axis of the bearing bore 101a of the sleeve 101 is not precisely perpendicular to the opposed face of the thrust flange 103 fixed to the shaft 102.

When the shaft 102 rotates in the conventional hydrodynamic bearing described above, a hydraulic pressure within the range of 2-5 atmospheric pressures is generated by the radial dynamic pressure generating grooves 109a and 109b. If the oil is driven by this hydraulic pressure to flow in the pores of the sleeve 101, the hydraulic pressure is reduced to 70% of the above-mentioned pressure. As a result, stiffness of the radial bearing is also reduced to approximately 70%. Japanese Unexamined Patent Publication No. 2003-322145 discloses a method of covering the entire surface of the sleeve 101 with a coating layer that is not permeable to oil in order to prevent the oil from entering the pores of the sleeve 101. This method includes a step of forming the coating layer. Consequently, the method has many steps and a high cost.

SUMMARY OF THE INVENTION

An object of the present invention is to provide a hydrodynamic bearing device including a sleeve made of sintered metal that can prevent working fluid, such as oil, from leaking externally. A further object of the present invention is to prevent stiffness of the radial bearing from decreasing. Still yet another object of the present invention is to maintain an appropriate bearing gap of a thrust bearing or a radial bearing to ensure stable non-contact rotation.

A hydrodynamic bearing device according to the present invention includes a sleeve having a bearing bore, a shaft that is inserted in the bearing bore of the sleeve in relatively rotatable manner, a thrust flange that is provided to an end of the shaft, a thrust member that is opposed to the thrust flange, a dynamic pressure generating groove formed on the inner surface of bearing bore and is, a dynamic pressure generating groove formed on at least one of the opposed surfaces of the thrust flange and a thrust member, and working fluid filled in a gap between the shaft and the bearing bore, and between the thrust flange the thrust member. The sleeve is a sintered body that is obtained by sintering a sintering material containing at least one selected from a group containing iron, an iron alloy, copper and a copper alloy. Pores of the sintered body are independent pores in which neighboring pores are independent from each other, and a diameter of the independent pores is smaller than each of a width and a height of a crest portion of the radial dynamic pressure generating groove.

According to the present invention, since pores in the sleeve made of a sintered body are independent pores, working fluid does not enter the sleeve, and therefore the working fluid does not leak through the sleeve. In addition, since a diameter of the independent pores is smaller than each of a width and a height of a crest portion of the radial dynamic pressure generating groove, functions of the radial dynamic pressure generating groove is hardly deteriorated even if an independent pore exist in the crest portion.

According to another aspect of the present invention, the hydrodynamic bearing device includes a sleeve having a bearing bore, a shaft that is inserted in the bearing bore of the sleeve in relatively rotatable manner, a thrust flange that is provided to an end of the shaft, a thrust member that is opposed to the thrust flange, a radial dynamic pressure generating groove formed on the inner surface of bearing bore so as to work as a radial bearing and is, a thrust dynamic pressure generating groove formed on one of the opposed surfaces of the thrust flange and a thrust member so as to work as a thrust bearing, and working fluid filled in a gap between the shaft and the bearing bore, and between the thrust flange the thrust member. The sleeve is a sintered body that is obtained by sintering a sintering material containing at least one selected from a group containing iron, an iron alloy, copper and a copper alloy. At least one of sintered body forming conditions including a molding pressure the sintered body, sintering temperature and sintering period that are sintering conditions, and an average grain size of metal grains of the sintering material is selected so that a diameter of the independent pores becomes smaller than each of a width and a height of a crest portion of the radial dynamic pressure generating groove.

According to the present invention, at least one of sintered body forming conditions of the sleeve made of a sintered body including, the molding pressure of the sintered body, the sintering temperature, the sintering period and the average grain size of metal grains of the sintering material is selected so that a diameter of the independent pores becomes smaller than each of a width and a height of a crest portion of the radial dynamic pressure generating groove. Thus, pores of the sleeve become independent pores. Accordingly, working fluid does not enter the sleeve, and therefore the working fluid does not leak through the sleeve. In addition, since a diameter of the independent pores is smaller than each of a width and a height of a crest portion of the radial dynamic pressure generating groove, functions of the radial dynamic pressure generating groove is hardly deteriorated even if an independent pore exist in the crest portion.

A method according to the present invention is used for manufacturing a hydrodynamic bearing device including a sleeve having a bearing bore, a shaft that is inserted in the bearing bore of the sleeve in relatively rotatable manner, a thrust flange that is provided to an end of the shaft, a thrust member that is opposed to the thrust flange, a dynamic pressure generating groove formed on the inner surface of bearing bore and is, a dynamic pressure generating groove formed on one of the opposed surfaces of the thrust flange and a thrust member and is, and working fluid filled in a gap between the shaft and the bearing bore, and between the thrust flange and the thrust member. The sleeve is a sintered body that is obtained by sintering a sintering material containing at least one selected from a group containing iron, an iron alloy, copper and a copper alloy. The method includes the step of selecting at least one of sintered body forming conditions including a molding pressure when the sintered body is molded, sintering temperature and sintering period that are sintering conditions, and an average grain size of metal grains of the sintering material so that pores of the sintered body are independent pores in which neighboring pores are independent from each other, and that a diameter of the independent pores becomes smaller than each of a width and a height of a crest portion of the radial dynamic pressure generating groove.

According to the present invention, in the molding and sintering steps for forming the sintered body of the sleeve, at least one of the molding pressure of the sintered body, sintering temperature, sintering period and an average grain size of metal grains of the sintering material is selected so that pores of the sintered body are independent pores in which neighboring pores are independent from each other, and that a diameter of the independent pores becomes smaller than each of a width and a height of a crest portion of the radial dynamic pressure generating groove. Thus, pores of the sleeve become independent pores. Accordingly, working fluid does not enter the sleeve, and therefore the working fluid does not leak through the sleeve. In addition, since a diameter of the independent pores is smaller than each of a width and a height of a crest portion of the radial dynamic pressure generating groove, functions of the radial dynamic pressure generating groove is hardly deteriorated even if an independent pore exist in the crest portion.

According to the present invention, all pores on the outer surface of the sintered body that constitutes the sleeve are independent pores, so working fluid does not enter the sleeve. Accordingly, the working fluid does not leak externally through the sleeve made of the sintered body.

Since a diameter of the independent pores is smaller than each of a width and a height of a crest portion of the radial dynamic pressure generating groove, the dynamic pressure generating grooves do not drop out largely due to the independent pores, the functions of the dynamic pressure generating groove are not affected largely.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DESCRIPTION OF THE PREFERRED EMBODIMENTS

Figure 1:
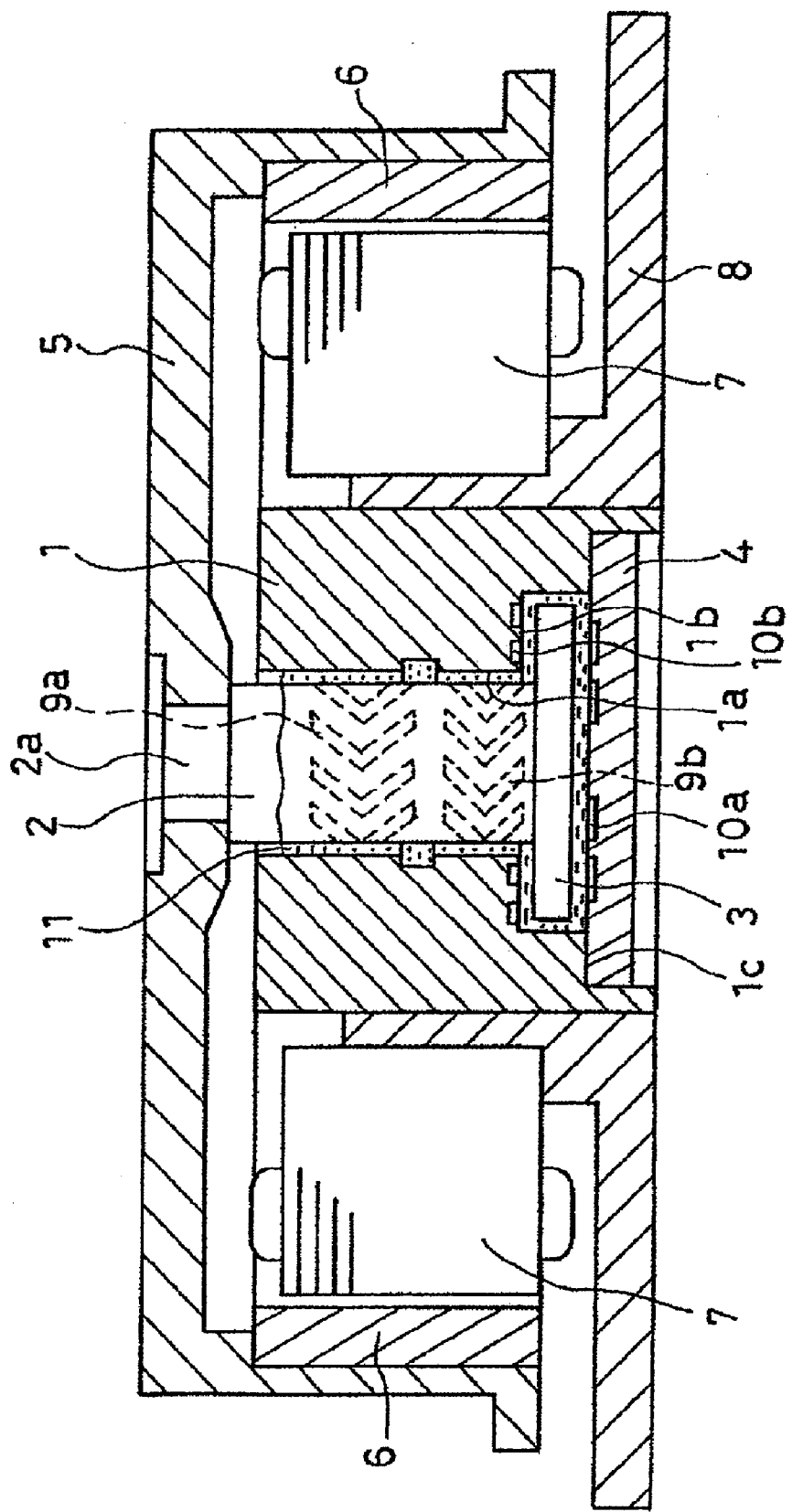
FIG. 1 is a cross sectional view of a spindle motor including a hydrodynamic bearing device according to a first embodiment of the present invention.

Selected embodiments of the hydrodynamic bearing device according to the present invention will be described with reference to FIGS. 1-8. Note that the following embodiments are just examples, and the present invention is not limited to these embodiments. In other words, it will be apparent to those skilled in the art from this disclosure that the following descriptions of the embodiments of the present invention are provided for illustration only and not for the purpose of limiting the invention as defined by the appended claims and their equivalents. In addition, in the following embodiments, overlapping description can be omitted by assigning the same reference numerals to the same elements.

First Embodiment

Hereinafter, the hydrodynamic bearing device according to a first embodiment of the present invention will be described with reference to FIGS. 1-4. The hydrodynamic bearing device of the present invention is especially useful as a spindle motor having a low cost and high reliability.

FIG. 1 is a cross sectional view of a spindle motor including a hydrodynamic bearing device according to a first embodiment of the present invention. As shown in FIG. 1, a sleeve 1 having a bearing bore 1a is made of a sintered body or sintered metal produced by sintering powdered metal containing at least one of iron, an iron alloy, copper and a copper alloy. The sleeve 1 is fixed to a base 8. A shaft 2 is made of a metal that is not a sintered body, and is inserted in the bearing bore 1a in a rotatable manner. The shaft 2 has a thrust flange 3 that is formed integrally therewith. The sleeve 1 includes a stepped end portion 1b that is coaxial with the bearing bore 1a. The stepped end portion 1b has a diameter larger than a diameter of the bearing bore 1a. The thrust flange 3 is housed in a space enclosed by the stepped end portion 1b of the sleeve 1 and a thrust plate 4 that is a thrust bearing member. A lower surface of the thrust flange 3 is opposed to the thrust plate 4. A rim portion of an upper surface of the thrust flange 3 is opposed to the stepped end portion 1b of the sleeve 1.

A rotor hub 5 is fixed to an upper end portion 2a of the shaft 2. A rotor magnet 6 of the spindle motor is fixed to the rotor hub 5. A motor stator 7 that is opposed to the rotor magnet 6 is fixed to the base 8. Radial dynamic pressure generating grooves 9a and 9b that are well known in the art are formed on at least one of an inner surface of the bearing bore 1a of the sleeve 1 and an outer surface of the shaft 2. A first thrust dynamic pressure generating groove 10a is formed on a surface of the thrust plate 4 that is opposed to the lower surface of the thrust flange 3. In addition, second thrust dynamic pressure generating grooves 10b are formed on a surface of the stepped end portion 1b of the sleeve 1 that is opposed to the upper surface of the thrust flange 3. Alternatively, the first or second thrust dynamic pressure generating groove 10a or 10b is formed on an opposed surface formed on the thrust flange 3. Oil 11, as working fluid, is filled in the space between the shaft 2 and the bearing bore 1a of the sleeve 1, including the radial dynamic pressure generating grooves 9a and 9b and the thrust dynamic pressure generating grooves 10a and 10b, as well as in the space between the thrust flange 3 and the sleeve 1 and the space between the thrust flange 3 and the thrust plate 4.

An operation of the hydrodynamic bearing device according to the first embodiment will be described with reference to FIG. 1. When the motor stator 7 is supplied with power, a rotation magnetic field is generated at the rotor magnet 6, so that the shaft 2 and the thrust flange 3 rotate as one body with the rotor hub 5. The radial dynamic pressure generating grooves 9a and 9b and the thrust dynamic pressure generating grooves 10a and 10b generate a pumping pressure that is well known in the art. The shaft 2 and the thrust flange 3 rotate without contacting the sleeve 1 and the thrust plate 4 respectively. In other words, the radial dynamic pressure generating grooves 9a and 9b form a radial bearing for supporting the shaft 2 in the radial direction in the bearing bore 1a without contact between them, while the thrust dynamic pressure generating grooves 10a and 10b form a thrust bearing for supporting the thrust flange 3 in the thrust direction without contacting the sleeve 1 and the thrust plate 4.

Figure 2:
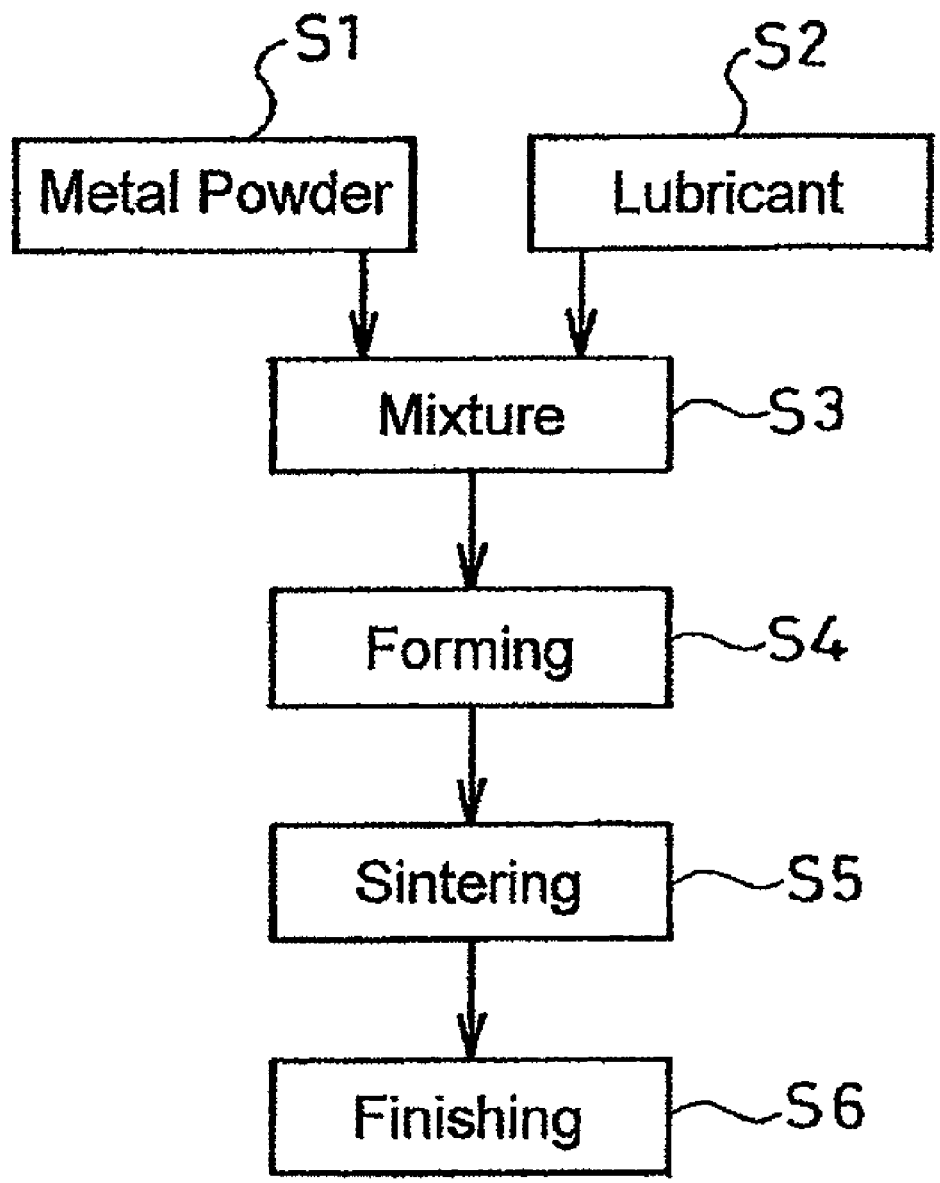
FIG. 2 is a flow chart showing a manufacturing process of a sleeve in the first embodiment.
Figure 3:
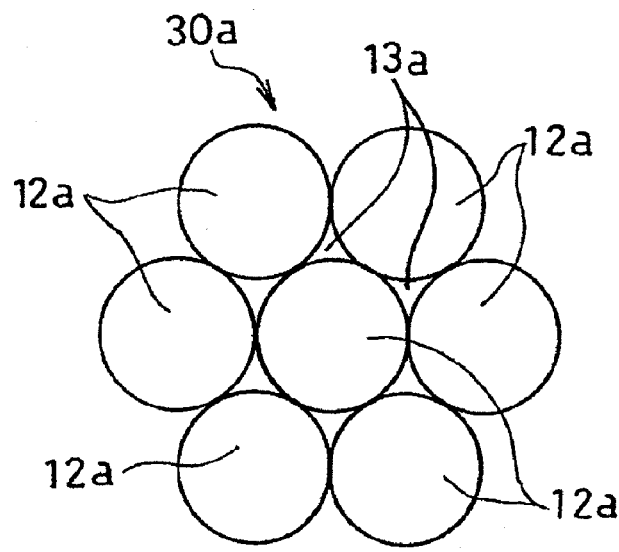
FIG. 3(a) is an enlarged view of a surface of a molded body containing large pores that communicate with each other.
FIG. 3(b) is an enlarged view of a surface of a sintered metal containing small pores that communicate with each other.
FIG. 3(c) is an enlarged view of a surface of the sintered metal containing independent pores.
Figure 3:
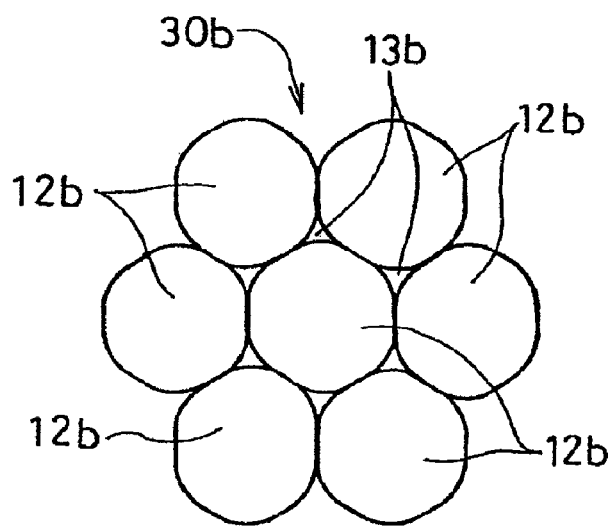
Figure 3:
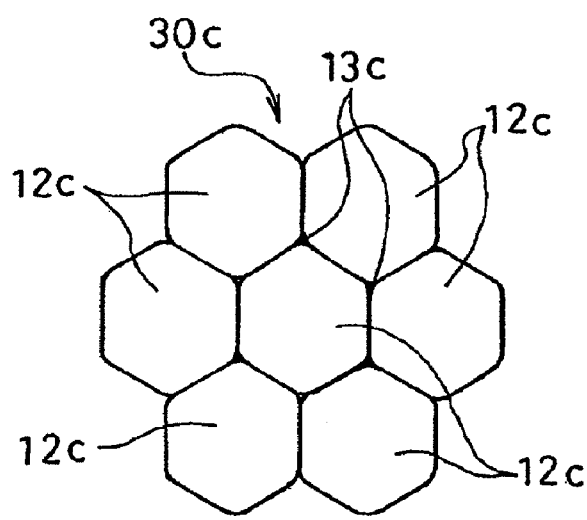

With reference to FIG. 2, a general process for producing the sleeve 1 from a material of the sintered metal will be described. In the step S1 shown in FIG. 2, powdered metal is prepared. The powdered metal is powder of iron, an iron alloy, copper, a copper alloy or the like. The material of the sintered metal usually has a grain diameter of approximately 0.1 mm, and is solely or a mixture of the iron, the iron alloy, the copper or the copper alloy. A lubricant is prepared in step S2. The lubricant is applied to the powdered metal so that they are mixed uniformly (step S3). The lubricant works as a parting agent when the powdered metal is molded. The mixed material is filled in a molding die that is formed to the shape of the sleeve 1, and a press or the like is used for compressing it at a predetermined molding pressure. Thus, a molded body is made by shaping it in a shape of the sleeve 1 (step S4). In the molded body, after the molding, the powdered metal is linked in a state that is nearly point contact. A molding die of the sleeve 1 can be provided with patterns of the radial dynamic pressure generating grooves 9a and 9b that are formed on the inner surface of the bearing bore 1a of the sleeve 1 and patterns of the thrust dynamic pressure generating grooves 10b that are formed on the stepped end portion 1b. Thus, the dynamic pressure generating grooves can be formed simultaneously when the sleeve 1 is molded in the step S4, resulting in very high efficiency. Under present circumstances, the radial dynamic pressure generating grooves 9a and 9b and the thrust dynamic pressure generating grooves 10b are formed by a machining process after sintering the sleeve 1.

Next, the molded body is heated to a predetermined temperature so as to be sintered, and thus, the sintered body is obtained (step S5). The heating process widens the contact portion among the powdered metal so as to form surface contacts so that the molded body is compressed and the volume is decreased. As a result, density of the sintered body increases and intensity is improved. Since contraction due to the sintering process causes reduction of size of the component, it is shaped in a little larger in advance and a machining process is performed, if necessary, so that the sleeve 1 is completed in a desired dimension (step S6).

The state of the "pores", which are small spaces existing in the sintered body, is changed by molding pressure and a sintering period when the molded body is heated and sintered. In addition, an average grain size of the metal grains of the sintering material also affects the state of the pores of the sintered body. When the molding pressure and the sintering temperature are increased and the sintering period is elongated, the size of the pores is reduced so that neighboring pores become "independent pores" that do not communicate with each other but are independent. The smaller the grain size of the metal grains becomes, the smaller the pores become so that independent pores are easily formed. The "molding pressure", the "sintering temperature", the "sintering period" and the "average grain size of metal grains" of the molded body are referred to as "sintered body forming conditions". A state of the pores on the surface (outer surface) of the sintered body will be described with reference to FIGS. 3(a), 3(b) and 3(c).

FIG. 3(a) is a partial enlarged view of a molded body 30a that is obtained by molding powdered metal 12a containing grains of approximately 0.1 mm in diameter using a mold. The powdered metal 12a is hardened in the state that neighboring grains contact each other at point of contact to the molded body 30a in a predetermined shape. In this state, pores 13a exist between neighboring grains of the metal 12a, so the neighboring pores 13a communicate each other.

FIG. 3(b) is a partial enlarged view of a sintered body 30b that is obtained by sintering the molded body 30a shown in FIG. 3(a) in the sintering step. In the sintering step, the molded body 30a is heated for a predetermined period at a predetermined temperature. Selecting the heating temperature and the heating period appropriately produces the pores substantially as desired in size. As shown in FIG. 3(b), neighboring grains of the powdered metal 12b contact each other as the points of contact are made flat by the sintering step, and the pores 13b have become smaller as a result. In this state, a density of the sintered body 30b is 70-90% of a real density of the metal material constituting the sintered body 30b. In the case of a sintered body made of a metal having a real density of approximately 8 (e.g., iron or copper) for example, the density becomes a value within the range of approximately 5.6-7.2. In this state, neighboring pores still communicate with each other, and the sintered body, having such a density, is generally used as a sintered bearing impregnated with oil.

FIG. 3(c) shows a surface of a sintered body 30c that is obtained by sintering the molded body 30a for a longer period (e.g., for three hours) at a higher temperature (e.g., 800 C degrees) than the case shown in FIG. 3(b). The grains of the powdered metal 12c are deformed to be a substantially hexagonal section. As a result the pores 13c become very small so that neighboring pores 13c become independent pores that do not communicate with each other. A density of the sintered body 30c in this state becomes a value above 90% of the real density of the metal material. In the case of a sintered body made of a metal having a real density of approximately 8 for example, the density becomes a value above 7.3. When the sintering is performed so that a density of the sintered body becomes a value close to the real density of the metal material, almost all of the pores become independent pores. In the sleeve 1 made of such a sintered body, almost all of the pores become independent pores. In general, the higher the heating temperature and the longer the heating period, the smaller the pores become. Thus, the sintered body becomes the same state as a metal block finally, and a density thereof becomes nearly equal to the real density of the metal material. There are infinite combinations of selection of the average grain size of the powdered metal and setting of the sintering temperature and the sintering period for making the pores of the sintered body independent pores. The metal material of the sintered metal also affects the state of the pores.

Figure 9:
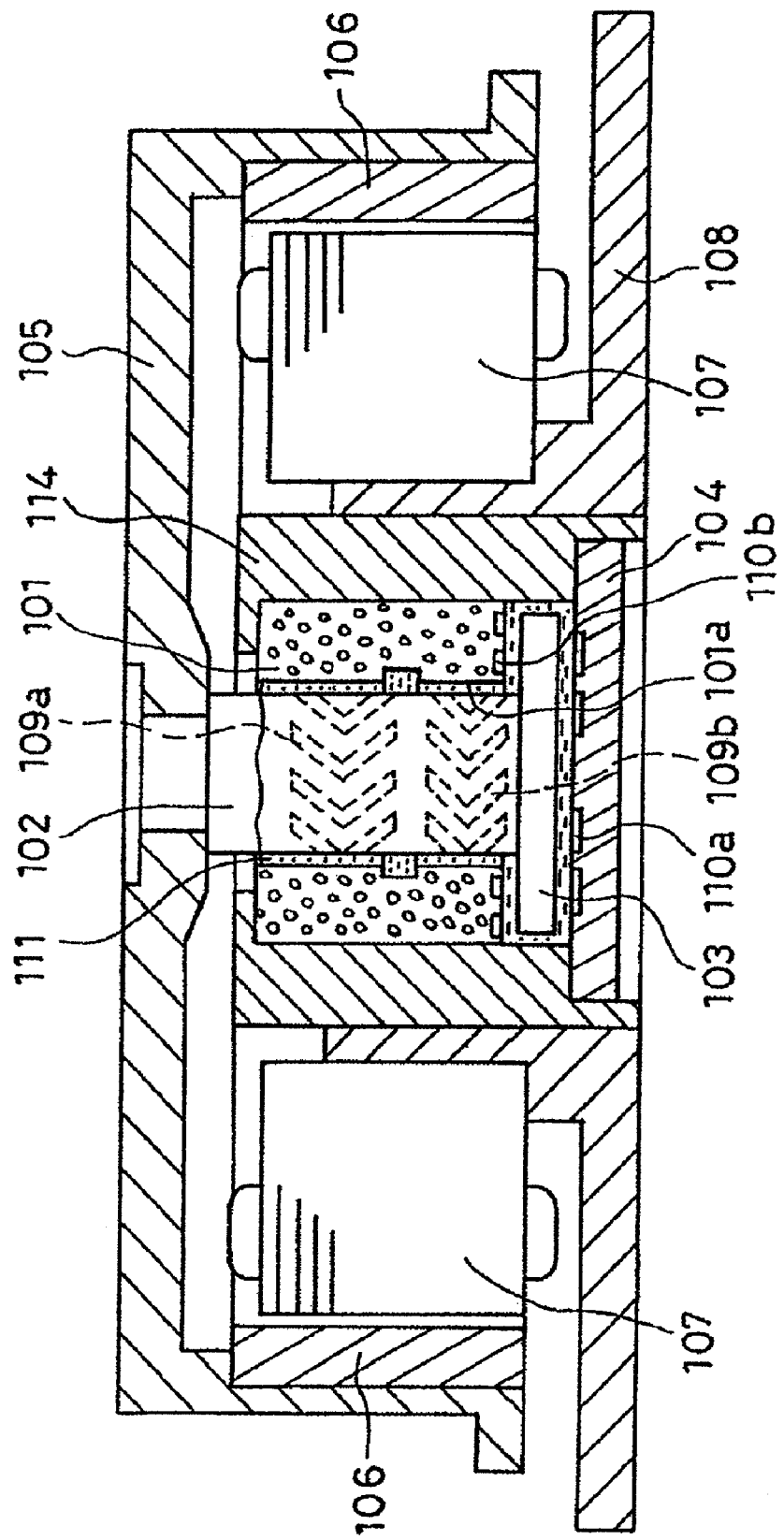
FIG. 9 is a cross sectional view of a spindle motor including a conventional hydrodynamic bearing.
Figure 10:
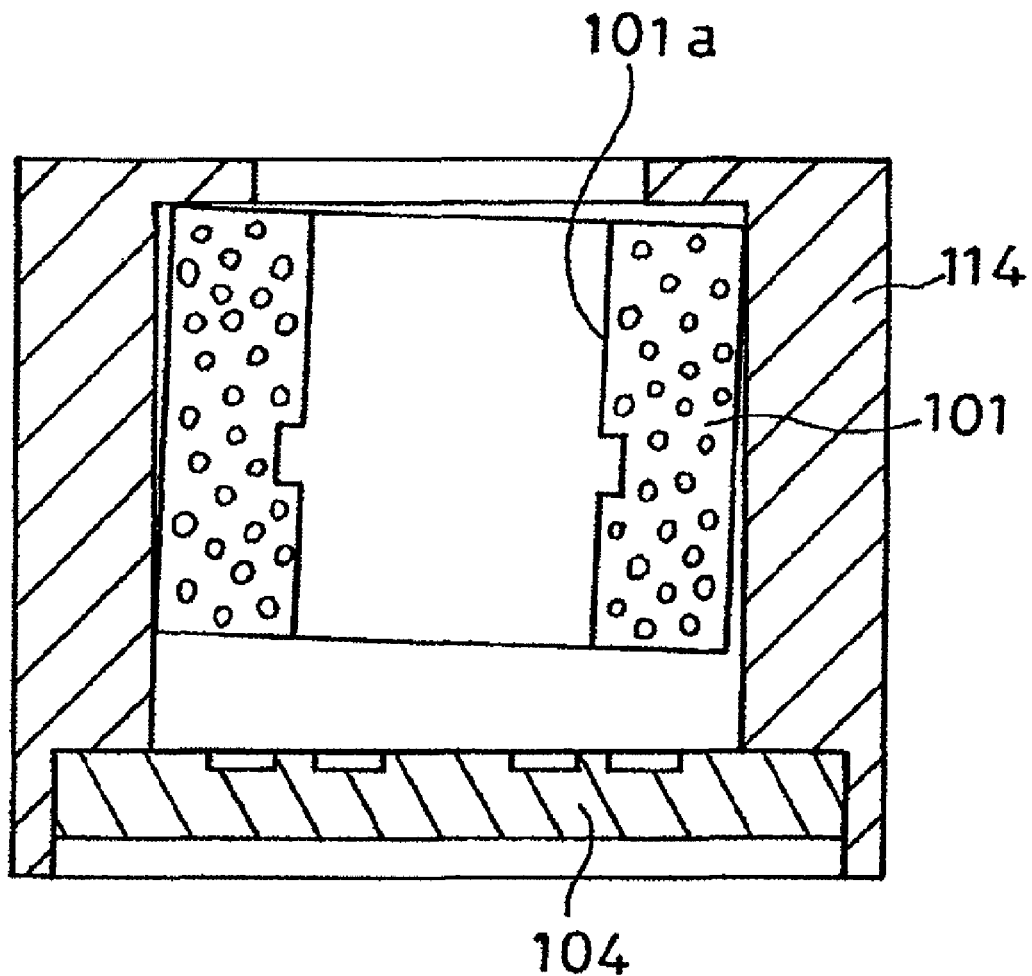
FIG. 10 is a cross sectional view of a main portion of the conventional hydrodynamic bearing showing an assembled state.

According to the present invention, at least one of the sintered body forming conditions is changed in accordance with a metal material to be used while manufacturing prototypes. Thus, the pores become independent pores. Sintered body forming conditions are selected so that a size of the independent pores becomes smaller than each of the width (W) and depth (D) of the crest portion of the radial dynamic pressure generating grooves 9a and 9b as described in detail with reference to FIG. 4. If all pores of the sleeve 1 are independent pores, the oil never passes through the sleeve 1 and leaks externally. Therefore, it is not necessary to cover the outer surface of the sleeve 101 with the sleeve cover 114 unlike the conventional structure, as shown in FIG. 9. Therefore, a hydrodynamic bearing having high reliability can be realized with a simple structure.

Figure 4:
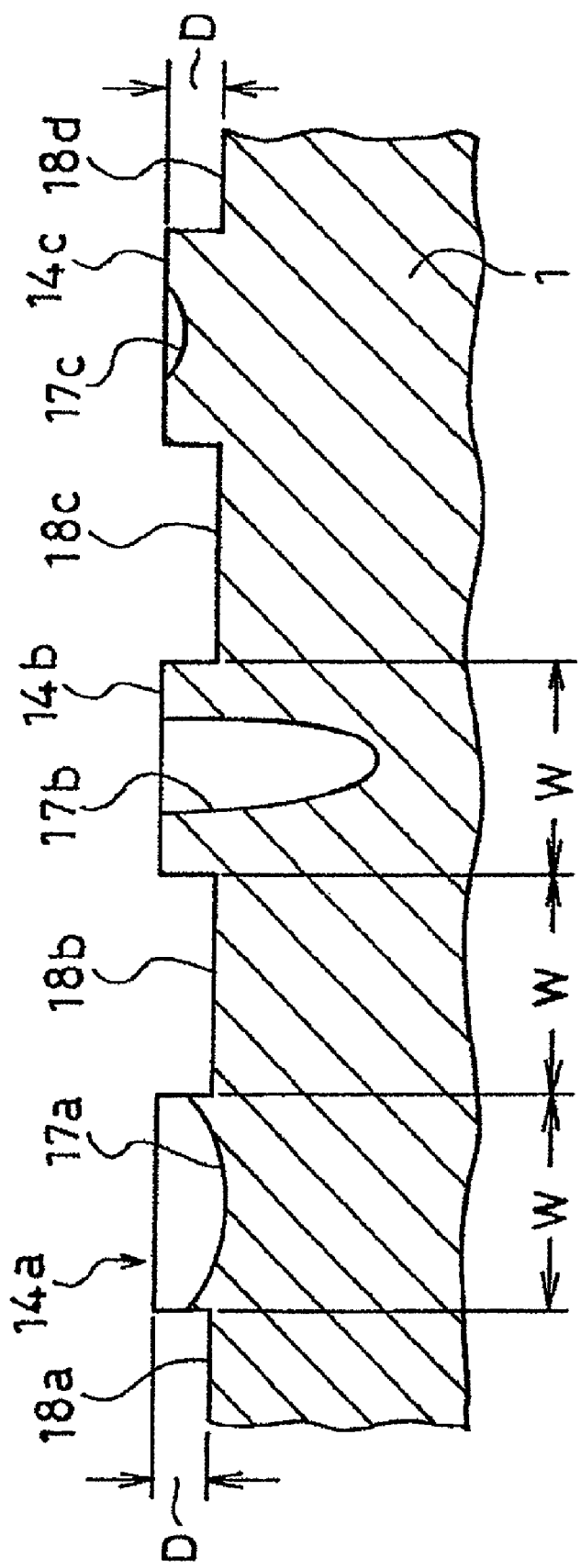
FIG. 4 is a partial enlarged view of a dynamic pressure generating groove having independent pores.

FIG. 4 is a diagram showing a partial enlarged view of the inner surface of the bearing bore 1a of the sleeve 1. The inner surface is provided with crest portions 14a, 14b and 14c and dynamic pressure generating grooves 18a, 18b, 18c and 18d. A width of the dynamic pressure generating grooves 18a-18d and a width W of the crest portions 14a-14c are both approximately 0.2 mm, and a depth D thereof is approximately 0.01 mm. The width W and the depth D shown in FIG. 4 are not proportional to the real size.

The crest portion 14a at the left end in FIG. 4 shows the example where a pore 17a having a larger diameter than the width W exists at the crest portion 14a. The pore 17a makes the dynamic pressure generating grooves 18a and 18b have a continuous large width (three times the width W), so the function of the dynamic pressure generating grooves is insufficient at the vicinity of this pore 17a.

The crest portion 14b at the middle in FIG. 4 shows the example where a pore 17b having a width smaller than the width W of the crest portion 14b and a larger depth exists. In this case, oil enters the pore 17b, and bearing stiffness is reduced at this portion.

The crest portion 14c at the right end in FIG. 4 shows the example where a pore 17c having a width much smaller than the width W and a depth smaller than the depth D exists. In this case the pore 17c hardly affects the dynamic pressure generating grooves 18c and 18d. As described above, if a diameter of the independent pores is smaller than each of the width W and the depth D of the crest portion that forms the dynamic pressure generating grooves 18a-18d, the function of the dynamic pressure generating grooves 18a-18d are substantially maintained. The crest portion 14c at the right end in FIG. 4 represents an example according to the present invention.

As another method for obtaining the independent pores, there is a known method of performing a finishing process on the sintered body after the sintering step. In the finishing process, the sleeve 1 of the sintered body after the sintering step is put in another die having a substantially similar shape to the molding die for producing the molded body and having dimensions a little smaller than the same so as to apply a pressure to the sleeve 1. Grains of the powdered metal 12a are deformed by the pressure and form intimate contacts with each other so that the pores become smaller. In addition, it is possible to perform a cold plastic process such as a coining process in which a pressure is applied to the surface of the sleeve 1 by using a pressing machine after the sintering step or a shaving process in which the surface is pressed and rubbed. These cold plastic processes can squash the pores on the surface of the sleeve 1 to be independent pores. However, compared with the method of this embodiment, it has a disadvantage in that a lot of process steps are necessary and cost for manufacturing is high. It is also possible to apply pressure and heat in the molding die when molding the sleeve 1. It is effective to make the grain size of the powdered metal small or to use a sintering material that is a mixture of two or more kinds of powdered metal having different grain sizes, so that the diameter of the pores in the molded body before sintering becomes as small as possible. There is a method of applying a special coating on the surface of the powdered metal so that the pores become even though although the cost increases. Furthermore, it is possible to plate the entire surface of the sleeve 1 so as to improve corrosion protection and abrasion resistance and to make auxiliary means for making the pores 13 independent pores 14.

As described above, since the sleeve 1 is made of a sintered metal in the hydrodynamic bearing device according to the first embodiment of the present invention, its cost is low and its productivity is high. The dynamic pressure generating grooves of the sleeve 1 are formed in a component rolling step as another step.

Since there are pores communicating with each other in the conventional sintered metal, oil leaks through the sleeve if the sleeve is made of conventional sintered metal. In the sintered metal of this embodiment, pores are independent pores, so oil does not pass through the sleeve and therefore does not leak externally.

The diameter of the independent pores is smaller than each of a width and a depth of the dynamic pressure generating groove. Therefore, even if there are pores in the crest portion of the dynamic pressure generating groove, they do not affect the function of the dynamic pressure generating groove. Thus, a hydrodynamic bearing device low cost and high reliability is realized.

Second Embodiment

Figure 5:
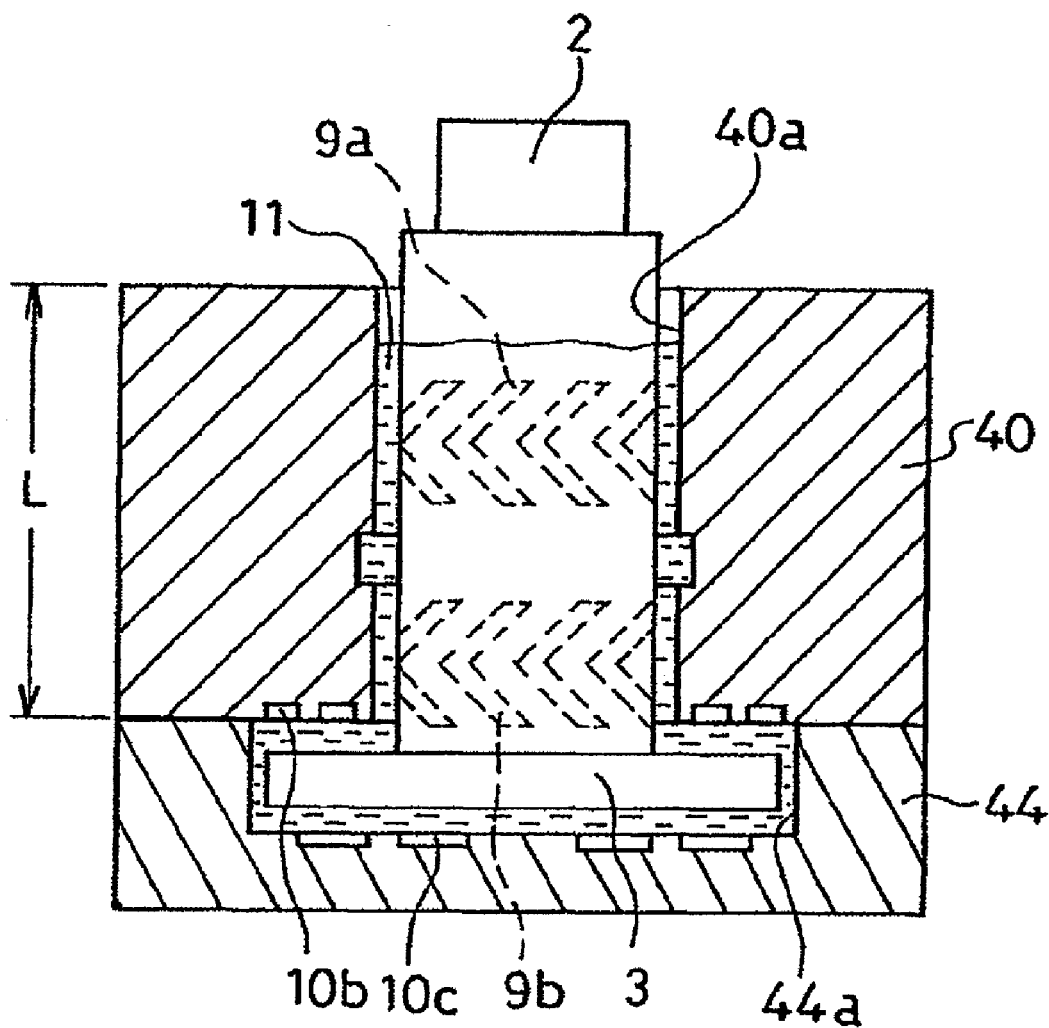
FIG. 5 is a cross sectional view of the hydrodynamic bearing according to a second embodiment of the present invention.

A hydrodynamic bearing device according to a second embodiment of the present invention will be described with reference to FIGS. 5, 6 and 7. FIG. 5 is a cross sectional view of the hydrodynamic bearing according to a second embodiment. As shown in FIG. 5, a sleeve 40 having a bearing bore 40a is a cylindrical sintered body. The inner surface of the bearing bore 40a is provided with radial dynamic pressure generating grooves 9a and 9b that are formed by a cold plastic process method (component rolling method) or the like. The lower end face of the sleeve 40 in FIG. 5 is provided with thrust dynamic pressure generating grooves 10b. The sleeve 40 has independent pores in the same way as the sleeve 1 in the first embodiment.

The thrust member 44 of the thrust bearing portion is a saucer-like member made of a sintered metal or a metal material that is not a sintered metal. The thrust member 44 has a circular recess 44a. A diameter and a depth of the recess 44a are adapted to house the thrust flange 3 that is fixed to the lower end portion of the shaft 2 with a tiny gap. The bottom surface of the recess 44a is provided with dynamic pressure generating grooves 10c. When the thrust member 44 is made of a sintered metal, it is formed by using a sintered body having independent pores similar to the sleeve 40.

The shaft 2 has the same structure as that in the first embodiment. The shaft 2 is inserted in the bearing bore 40a so that the thrust flange 3 at the lower end portion is opposed to the thrust dynamic pressure generating grooves 10b, and the thrust member 44 is fixed to the sleeve 40. The thrust dynamic pressure generating grooves 10b and 10c and the thrust flange 3 constitute the thrust bearing portion.

When the hydrodynamic bearing device of the second embodiment is equipped with the hub 5 and the base 8 or the like similar to the structure shown in FIG. 1, a spindle motor is constituted.

Since the sleeve 40 of the second embodiment has a simple cylindrical shape, it has a characteristic that dimensional accuracy of each portion after sintering process is higher than that of the sleeve 1 in the first embodiment. Hereinafter, the molding step of the sleeve 40 will be compared with that of the sleeve 1, so as to explain the higher why dimensional accuracy of the sleeve 40 than the sleeve 1.

Since the sleeve 40 is a sintered body, it is slightly contracted in the sintering step. A quantity of contraction varies in accordance with an unevenness of a density distribution of the molded body, an unevenness of a temperature distribution when temperature rises in the sintering step, a variation of the sintering temperature and other factors. In order to improve dimensional accuracy of the sintered body, it is necessary to improve precision of the molding die and to make the density distribution of the molded body as uniform as possible. The density distribution of the molded body has a tendency to be uniform as the shape of the molded body is simpler.

The step for obtaining the molded body of the sleeve by putting the powdered metal of the sintering material in a molding die and pressing the same will be described with reference to FIGS. 6 and 7. FIG. 6 is a cross sectional view of a main portion of a molding die 50 for molding the sleeve 40 in the second embodiment. FIG. 7 is a cross sectional view of a main portion of a molding die 52 for molding the sleeve 1 in the first embodiment.

Figure 6:
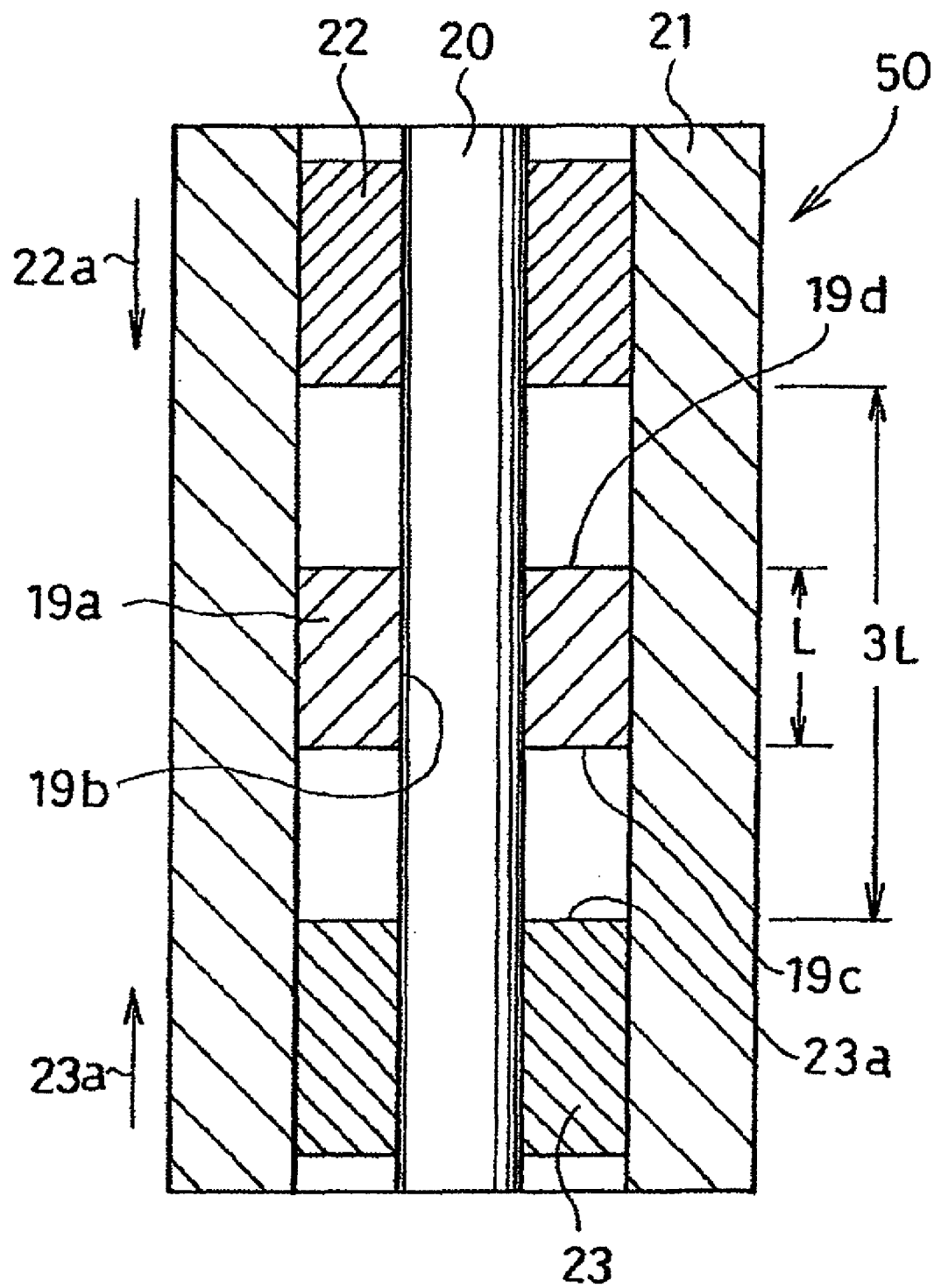
FIG. 6 is a cross sectional view of a main portion of a molding die for molding the sleeve in the second embodiment of the present invention.

As shown in FIG. 6, a bar-like inner die 20 is fixed inside the cylindrical outer die 21 in a coaxial manner with the outer die 21. The internal diameter of the outer die 21 corresponds to the outer diameter of the sleeve 40 shown in FIG. 5, while the external diameter of the inner die 20 corresponds to the inner diameter of the bearing bore 40*a*. An upper die 22 and a lower die 23 are disposed inside the outer die 21. The upper die 22 and the lower die 23 move in the direction of arrows 22*a* and 23*a*, respectively, inside the outer die 21. The dimension in FIG. 6 is a thickness of the molded body that is obtained by the molding die 50, which corresponds to a length L of the sleeve 40 shown in FIG. 5. The dimension 3L indicates a space between the upper die 22 and the lower die 23 when they are opened.

The sintering material obtained in the step S3 shown in FIG. 2 is added between the upper die 22 and the lower die 23. The upper die 22 and the lower die 25, in the state illustrated in FIG. 6, are separated with a space of the dimension 3L. When the sintering material is added, either one of the upper die 22 and the lower die 23 is removed. Next the upper die 22 is moved in the direction of the arrow 22*a*, and the lower die 23 is moved in the direction of the arrow 23*a*. In other words, the upper die 22 and the lower die 23 are moved in their respective direction by the same distance so as to press the sintering material. When the upper die 22 and the lower die 23 are moved until a gap distance L is formed, the molded body 19*a* is obtained. FIG. 6 shows the state where the molding is completed and the molding dies 22 and 23 have returned to their positions, respectively. Radial dynamic pressure generating grooves 9*a* and 9*b* and thrust dynamic pressure generating grooves 10*b* are formed on the molded body 19*a* in a component rolling step that is another step similar to the sleeve 40 shown in FIG. 5.

In the molding step shown in FIG. 6, the sintering material that is placed between the upper die 22 and the lower die 23 having the dimension 3L is pressed and molded into the ring-like molded body 19*a*. In other words, since it is molded into the ring-like shape that is a simple shape, the obtained molded body 19*a* has a very uniform density distribution with little partial variation of density. In addition, when plural molded bodies 19*a* are produced, a variation of density among them is relatively small.

A difference between the right angle and an angle defined by the axis of a hole 19*b* of the molded body 19*a* and the bottom face 19*c* (hereinafter, a difference between the right angle and an angle is referred to as perpendicularity) is determined by perpendicularity of the axis of the inner die 20 with respect to a press face 23*a* of the lower die 23, a gap size between the lower die 23 and the inner die 20, and a gap size between the lower die 23 and the outer die 21. Since each of the inner die 20, the outer die 21, the upper die 22 and the lower die 23 has a simple shape, the above-mentioned gaps can be set to appropriate values so that a desired accuracy can be obtained. Therefore, the perpendicularity of the axis of the hole 19*b* with respect to the bottom face 19*c* can be set to an appropriate value, too. Thus, a molded body 19*a* having a desired high precision can be obtained.

In the above mentioned embodiment, both the upper die 22 and the lower die 23 are moved in the molding step shown in FIG. 6. If the lower die 23 is fixed and only the upper die 22 is moved as shown by the arrow 22*a*, however, pressure distribution inside the sintering material that is pressed by the upper die 22 is not the same as pressure distribution inside the sintering material that is placed on the lower die 23. In other words, the pressure applied by the upper die 22 is transmitted to the lower die 23 and is imparted to the inner die 20 and the outer die 21. Therefore, a force applied from the upper die 22 to the molded body 19*a* in the molding step is not the same as a force that is applied from the lower die 23 to the molded body 19*a*. Accordingly, there is a difference in density between the upper surface 19*d* and the lower surface 19*c* of the molded body 19*a*. Thus, there is a case where a portion of low density is contracted so that a warp is generated when the molded body 19*a* having uneven density between the upper surface 19*d* and the lower surface 19*c* is sintered. Therefore, the molding method in which one of the upper die 22 and the lower die 23 is fixed and the other is moved cannot produce the sleeve 40 having a desired accuracy. In this second embodiment, the sleeve 40 having a desired accuracy can be obtained because both the upper die 22 and the lower die 23 are moved for molding.

Figure 7:
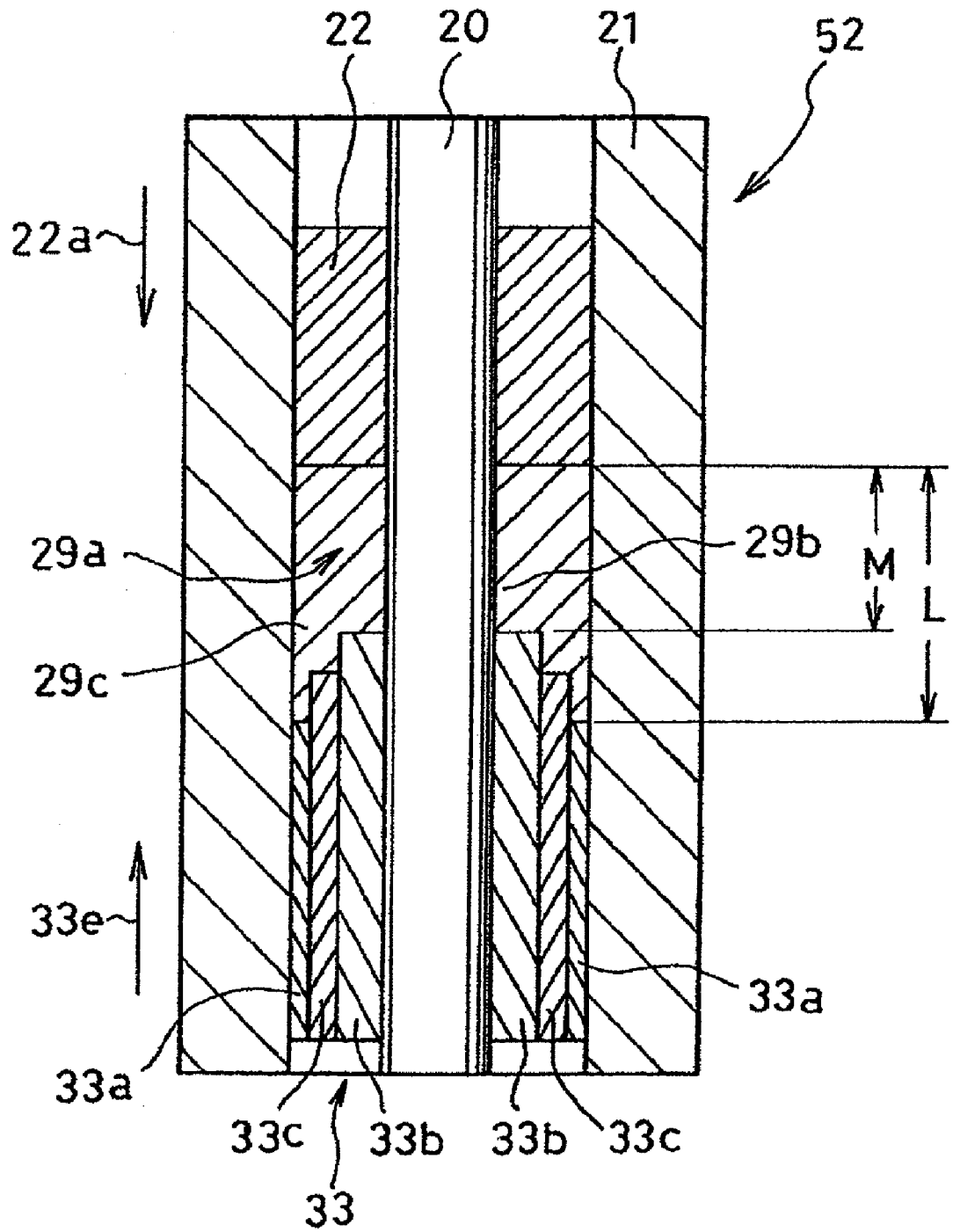
FIG. 7 is a cross sectional view of a main portion of a molding die for molding the sleeve in the first embodiment of the present invention.

With reference to FIG. 7 a molding die of the sleeve 1 in the first embodiment will be described. Since the sleeve 1 has stepped end portions 1*b* and 1*c*, the lower die 33 of the molding die 52 includes an outer die 33*a*, an inner die 33*b* and a middle die 33*c* that move independently. Other structures are the same as those shown in FIG. 6.

Figure 8:
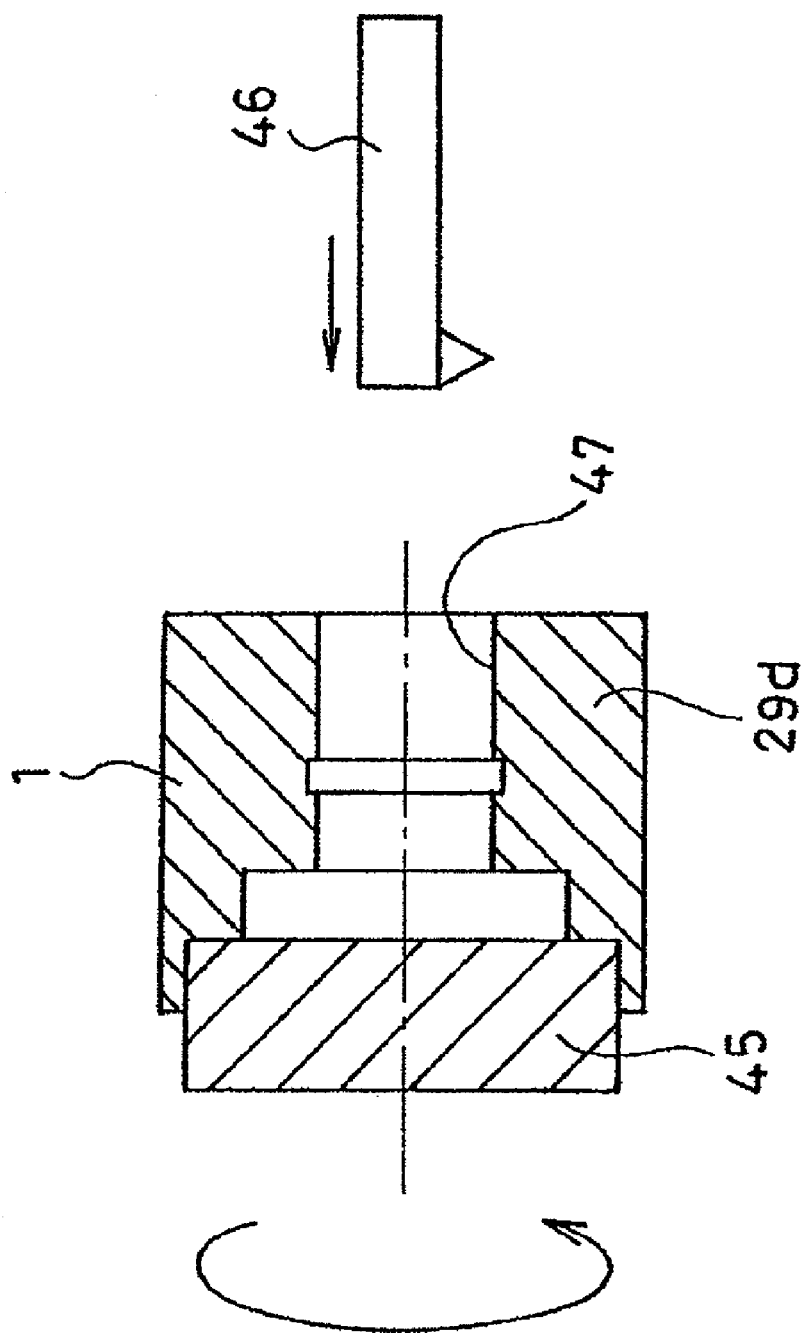
FIG. 8 is a cross sectional view showing a machining process of the sleeve using a lathe.

In the molding step, the molding die 52 is opened so that a gap between the upper die 22 and the outer die 33*a* as well as the inner die 33*b* as well as the middle die 33*c* of the lower die 33 becomes a dimension 3L (not shown), and the space is filled with the sintering material. Next, the upper die 22 is moved in the direction of the arrow 22*a* and the outer die 33*b*, the inner die 33*a* and the middle die 33*c* are moved in the direction of the arrow 33*e* by the same distance so as to press the sintering material. After the sintering material is pressed to a thickness of the dimension L, the inner die 33*b* and the middle die 33*c* are further moved in the direction of the arrow 33*e* so as to press a middle portion 29*b* of the molded body 29*a* to be the dimension M. As a result, the molded body 29*a* is obtained. The middle portion 29*b* of the molded body 29*a* has a higher density than the density of the outer circumference portion 29*c*. In addition, density is different between the lower surface and the upper surface of the middle portion 29*b*. The reason is that when the middle portion 29*b* is molded, the upper die 22 is still while the inner die 33*b* is moved in the direction of the arrow 33*e* so as to press the middle portion 29*b*. When the molded body 29*a* having uneven density among portions is sintered, a distortion will be generated due to the unevenness of the density. Therefore, in order to obtain the sleeve 1 with a desired dimension of each portion from the sintered body obtained by sintering the molded body 29*a*, a lathe process is performed as shown in FIG. 8, for example. In this process, the sintered body 29*d* is fixed to an air chuck 45 of a lathe machine so that a turning tool 46 cuts the bearing bore 47 to a desired dimension. It is desirable to make the sintered body 29*d* a little larger in expectation of the cutting process. As understood from the molding process described above, the sleeve 40 of the second embodiment can realize high accuracy of dimensions after the sintering step. Therefore, the finishing process can be simple, and costs are reduced as a result.

Figure 11:
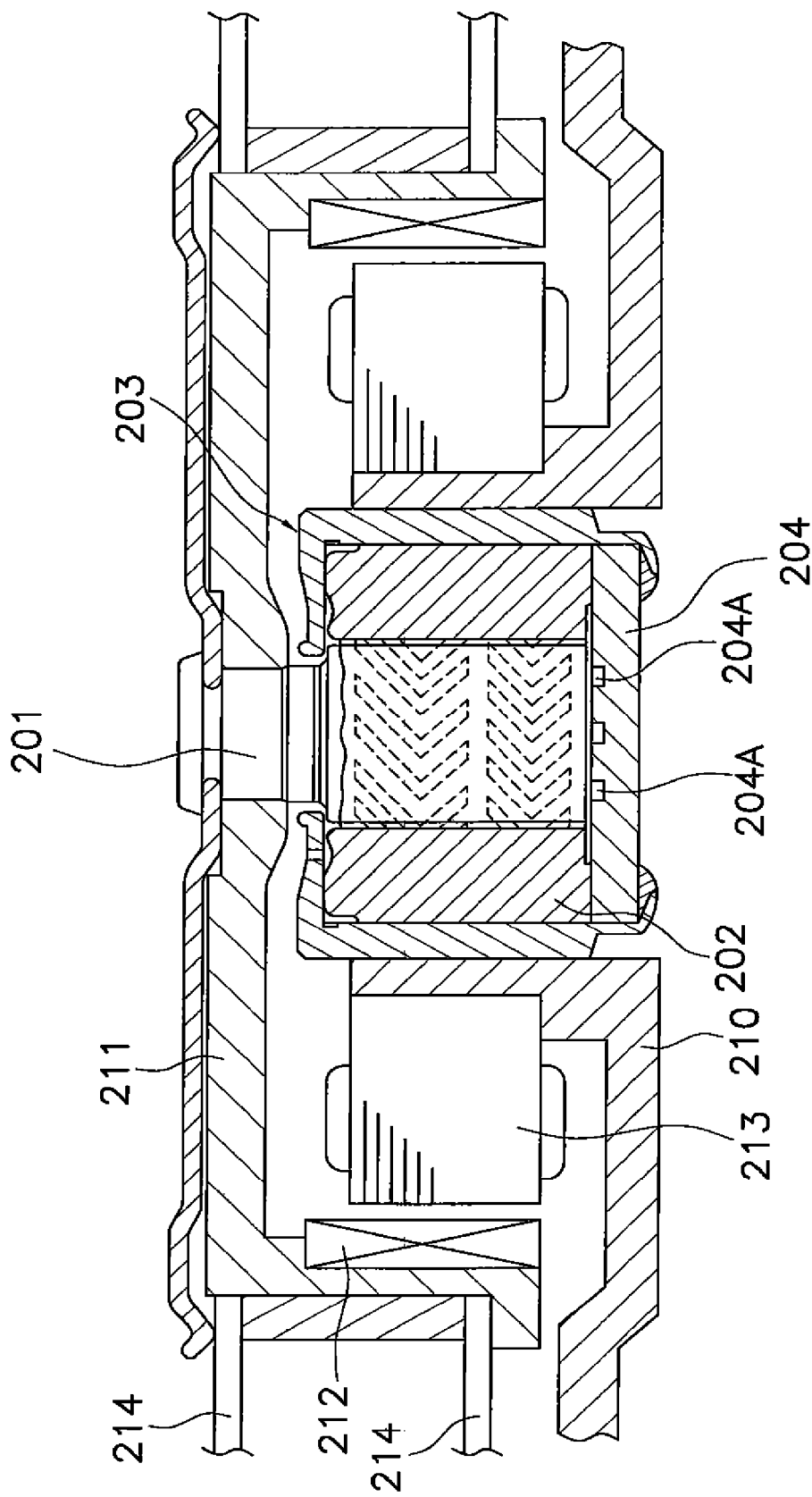
FIG. 11 is a cross sectional view of a spindle motor including a hydrodynamic bearing device according to an additional embodiment of the present invention.
Figure 12:
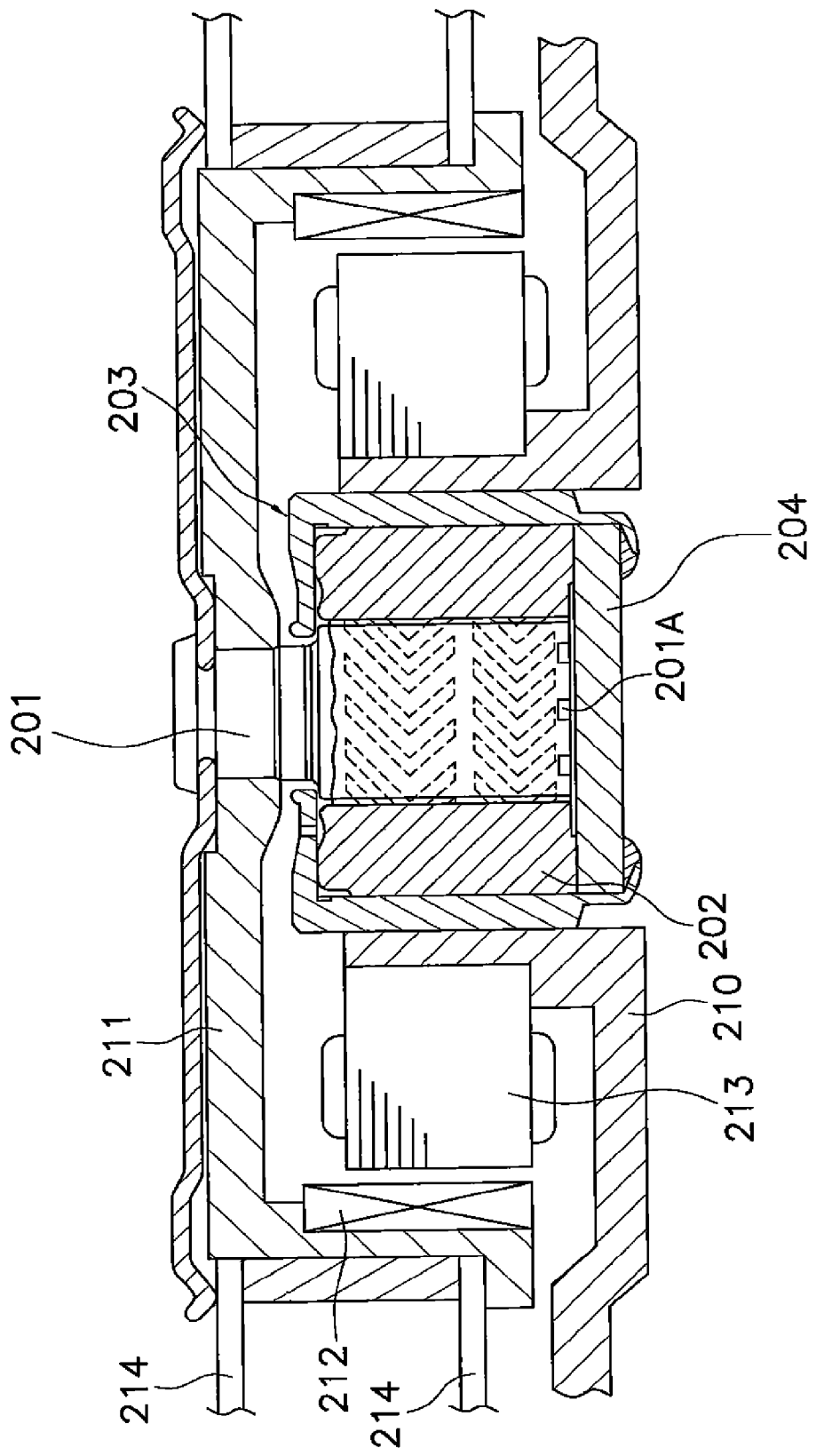
FIG. 12 is a cross sectional view of a spindle motor including a hydrodynamic bearing device according to a further additional embodiment of the present invention.

In this case, we described hydrodynamic bearing having a shaft with flange. But it is possible to adapt this invention to a hydrodynamic bearing having a shaft without flange, as shown in FIGS. 11 and 12. A hydrodynamic bearing shown in FIGS. 11 and 12 comprises a shaft 201, an inner sleeve 202, an outer sleeve 203, a thrust member 204, a base 210, a rotor hub 211, a rotor magnet 212, a motor stator 213 and discs 214. A thrust pressure generating groove 204A is formed on the thrust member 204 of the hydrodynamic bearing having a shaft 201 without flange in FIG. 11. A thrust pressure generating groove 201A is formed on the end of the shaft 201 in FIG. 12.

While only selected embodiments have been chosen to illustrate the present invention, it will be apparent to those skilled in the art from this disclosure that various changes and modifications can be made herein without departing from the scope of the invention as defined in the appended claims.

Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A hydrodynamic bearing device comprising:

a sleeve having a bearing bore with a dynamic pressure generating groove formed on an inner surface of the bearing bore, the dynamic pressure generating groove being defined by at least one crest portion adjacent to the dynamic pressure generating groove;

a shaft disposed in the bearing bore of the sleeve in a relatively rotatable manner;

a thrust member opposed to an end of the shaft;

a dynamic pressure generating groove formed on at least one of opposing surfaces of the end of the shaft and the thrust member; and working fluid filled in a gap between the shaft and the bearing bore, and between the end of the shaft and the thrust member, the sleeve being a sintered body including a sintering material containing at least one selected from a group containing iron, an iron alloy, copper and a copper alloy, such that pores in the at least one crest portion adjacent to the dynamic pressure generating groove of the sintered body are independent pores in which respective neighboring pores do not communicate with each other, and a diameter of the independent pores is smaller than each of a width and a depth of the at least one crest portion adjacent to the dynamic pressure generating groove.

2. The hydrodynamic bearing device according to claim 1, wherein the at least one of the opposing surfaces containing the dynamic pressure generating groove is a surface of the thrust member.

3. The hydrodynamic bearing device according to claim 1, wherein the thrust member is made of a sintered metal.

4. The hydrodynamic bearing device according to claim 1, wherein the at least one of the opposing surfaces containing the dynamic pressure generating groove is a surface of the thrust member, and wherein the dynamic pressure generating groove is a thrust dynamic pressure generating groove.

5. A hydrodynamic bearing device comprising:

a sleeve having a bearing bore with a dynamic pressure generating groove formed on an inner surface of the bearing bore, the dynamic pressure generating groove being defined by at least one crest portion adjacent to the dynamic pressure generating groove;

a shaft disposed in the bearing bore of the sleeve in a relatively rotatable manner;

a thrust member opposed to an end of the shaft;

a dynamic pressure generating groove formed on at least one of opposing surfaces of the end of the shaft and the thrust member; and working fluid filled in a gap between the shaft and the bearing bore, and between the end of the shaft and the thrust member the sleeve being a sintered body including a sintering material containing at least one selected from a group containing iron, an iron alloy, copper and a copper alloy, such that pores in the at least one crest portion adjacent to the dynamic pressure generating groove of the sintered body are independent pores in which respective neighboring pores do not communicate with each other, and at least one of sintered body forming conditions including a molding pressure when the sintered body is molded, sintering temperature and sintering period that are sintering conditions, and an average grain size of metal grains of the sintering material being selected so that a diameter of the independent pores becomes smaller than each of a width and a depth of the at least one crest portion adjacent to the dynamic pressure generating groove.

6. The hydrodynamic bearing device according to claim 5, wherein the at least one of the opposing surfaces containing the dynamic pressure generating groove is a surface of the thrust member.

7. The hydrodynamic bearing device according to claim 5, wherein the thrust member is made of a sintered metal.

8. The hydrodynamic bearing device according to claim 5, wherein one of the sleeve and the thrust member includes an additional opposing surface with an additional dynamic pressure generating groove, the additional dynamic pressure generating groove comprising a thrust dynamic pressure generating groove.

* * * * *